United States Patent [19]

Muelleman

[11] Patent Number: 5,781,386
[45] Date of Patent: *Jul. 14, 1998

[54] LOW LEVEL GROUND CONDITIONING (GCL)

[75] Inventor: Norman F. Muelleman, Cary, Ill.

[73] Assignee: Powervar, Inc., Lake Forest, Ill.

[*] Notice: The term of this patent shall not extend beyond the expiration date of Pat. No. 5,666,255.

[21] Appl. No.: 692,928

[22] Filed: Jul. 30, 1996

Related U.S. Application Data

[63] Continuation-in-part of Ser. No. 461,499, Jun. 5, 1995, Pat. No. 5,666,255.

[51] Int. Cl.$^6$ .................................................. H02H 9/08
[52] U.S. Cl. ........................... 361/43; 361/58; 361/111
[58] Field of Search ...................... 361/111, 58, 42, 361/43, 45, 46, 49, 50, 56

[56] References Cited

U.S. PATENT DOCUMENTS

| | | | |
|---|---|---|---|
| 4,178,617 | 12/1979 | Reichel | 361/43 |
| 4,710,861 | 12/1987 | Kanner | 363/46 |
| 4,751,607 | 6/1988 | Smith | 361/119 |
| 5,038,245 | 8/1991 | Gronskog | 361/56 |
| 5,388,021 | 2/1995 | Stahl | 361/56 |
| 5,448,443 | 9/1995 | Muelleman | 361/111 |
| 5,510,945 | 4/1996 | Taylor et al. | 361/45 |
| 5,666,255 | 9/1997 | Muelleman | 361/111 |

*Primary Examiner*—Jeffrey A. Gaffin
*Assistant Examiner*—Michael J. Sherry
*Attorney, Agent, or Firm*—Lee, Mann, Smith, McWilliams, Sweeney & Ohlson

[57] ABSTRACT

The present invention relates to suppressing transient impulses in a power distribution system and more particularly to a device and method for suppressing transient impulses at frequencies which exceed the power frequencies while maintaining an acceptable "safety" impedance level at the power frequencies.

6 Claims, 8 Drawing Sheets

*Fig. 21* INSULATED GROUND (IG) RECEPTACLE

*Fig. 22* IG RECEPTACLE

*Fig. 23* IG RECEPTACLE

LOW LEVEL GROUND CONDITIONING (GCL)

RELATED APPLICATION

This application is a continuation-in-part of Ser. No. 08/461,499 U.S. Pat. No. 5,666,253 filed Jun. 5, 1995, which is incorporated by reference.

BACKGROUND OF THE INVENTION

Introduction to Ground Conditioning (GC)

Figure 1:
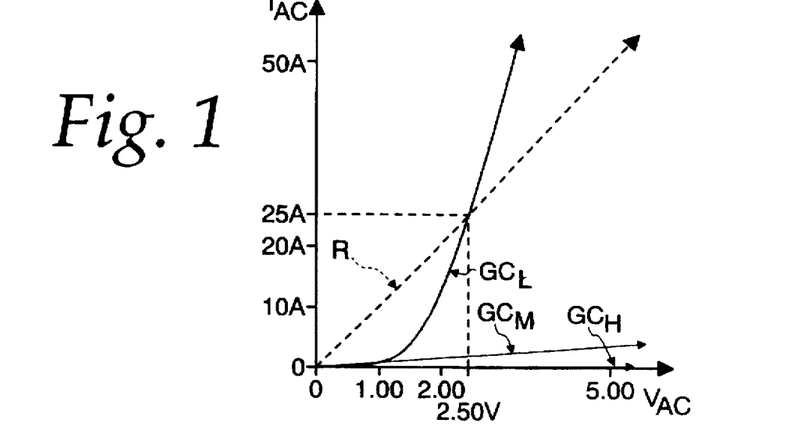
FIG. 1 is a graph showing AC voltage versus current characteristics of $GC_L$ versus that of a pure resistor.

Low Level Ground Conditioning ($GC_L$) is one of the technologies disclosed in the aforementioned patent application. A standalone $GC_L$ circuit is characterized in the schematic of FIG. 10 of that application, corresponds generally to FIG. 3 of this application. $GC_L$ electrical characteristics are graphically shown in FIG. 12 of my Ser. No. 08/461,499 application and a more complete graph showing $GC_L$ voltage versus current characteristics compared to that of a pure resistor, R, is shown in FIG. 1 of this application.

Ground Conditioning (GC) is the "safe" insertion of an electrical impedance in the ground line of a power distribution system. "Safe" is determined by the safety agencies such as Underwriters Laboratories (UL), CSA or VDE. GC's purpose is to reduce or eliminate electrical noise, surges, impulses or power currents on the safety ground line from interfering or damaging electronic systems referenced by said ground line.

Until I introduced the concept of ground conditioning, the safety agencies' standards effectively discouraged those concerned with electrical protection of electronic systems from considering or pursuing protection of the ground line. There are many different kinds of protection of the other lines (Hot (L) and Neutral (N)) but, the ground line was considered a "do not tamper" safety requirement.

UL had limited ground impedances to be 0.1 Ohms or less at the power frequency, 60 Hz. There are companies that recognized the benefits of putting an impedance in the ground line, and did so; but, they also limited the impedance value to 0.1 Ohms at the power frequency.

The novelty of my ground impedance designs is that under various controlled conditions, the presence of either a ground fault circuit interrupter (GFCI) ($GC_H$), an isolation transformer ($GC_M$), or prescribed saturation characteristics ($GC_L$), the ground impedance would be allowed to exceed the 0.1 Ohm limitation.

Figure 4:
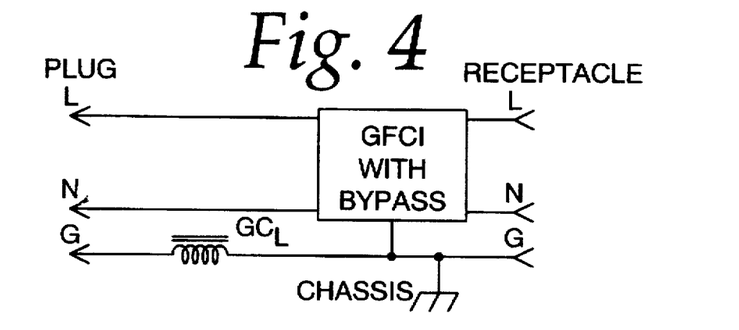
FIG. 4 is a schematic of a $GC_H$ Standalone circuit.
Figure 5:
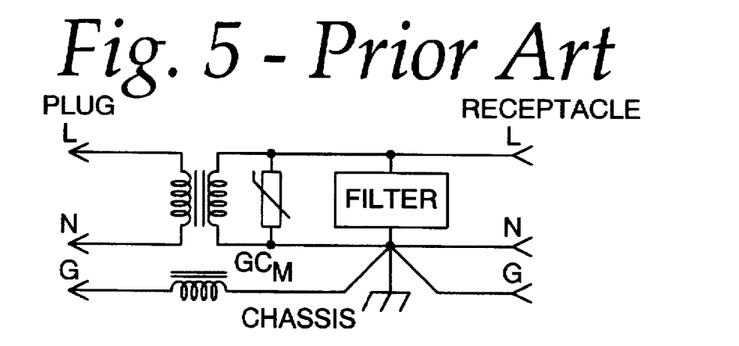
FIG. 5 is a schematic of a $GC_M$ Standalone circuit.
Figure 6:
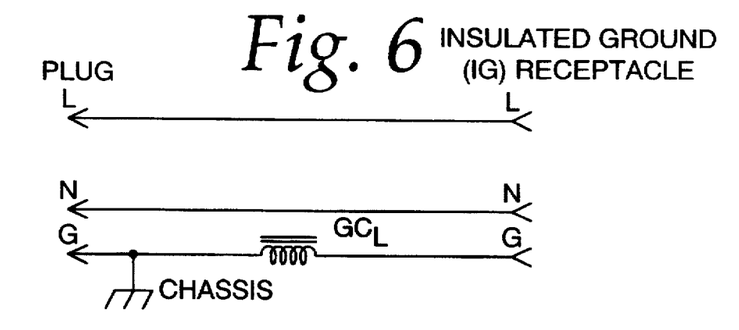
FIG. 6 is a schematic of a second $GC_L$ Standalone circuit.

I have invented three (3) methods to safely include an impedance in the safety ground that is greater than 0.1 Ohms at the power frequency, 60 Hz, and still satisfy the safety agency (UL) requirement for safety grounding. I refer to the three (3) GC approaches as High Level Ground Conditioning ($GC_H$), Medium Level Ground Conditioning ($GC_M$), and Low Level Ground Conditioning ($GC_L$). Their schematics in standalone configuration are shown in FIGS. 4, 5, and 6, respectively.

The three categorizations differentiate the three levels of ground protection (or impedance) at the power frequencies, either 50 or 60 Hz. High Level ($GC_H$) is the largest ground impedance with required associated protection circuitry—specifically a GFCI—that the safety agency (UL) will allow at 60 Hz. Low Level ($GC_L$) is the highest impedance allowed without any required associated protection circuits—relies on the intrinsic saturation characteristics of the ground impedance. At 60 Hz, the impedance of $GC_H$ could be up to a hundred times (or more) higher than the safety agency limitation imposed on $GC_L$. Medium Level Ground Conditioning ($GC_M$) is somewhere in the middle, but like $GC_H$, requires associated protection circuitry—specifically an isolation transformer with N—G bond of the secondary and prescribed primary winding and wiring construction.

Typically, but not limited to this embodiment, the GC impedances are inductors shunted by snubbing resistors. The snubbing resistors are connected in parallel with the inductor. Snubbing resistors are not required by safety considerations. For improved performance in the field, they are included to address impedances of certain natural resonances that occur at high frequencies, typically noise frequencies. While the safety considerations at low frequencies do not require snubbing resistors, use of a snubbing resistor can correct unwanted resonances.

The design goal of each GC impedance is that the inductive element will determine the ground impedance at the power frequencies, 50 or 60 Hz, while the snubbing resistor (typically 1,000 Ohms) will dominate (XL>R) in the noise frequency region, 10 KHz to 10 MHz.

Each GC impedance type will of course have its own impedance characteristic in the transitional frequencies between the power frequencies and the noise frequency spectrum. The transitional frequency spectrum has not been a consideration in the design of these GC impedances.

A distinction is made between high and low level ground conditioning. Low level ground conditioning $GC_L$ operates within the impedance of 0.1 Ω or less for currents more than 25 A at 2.5 VAC, as shown in FIG. 1 whereas high level ground conditioning $GC_H$ is an impedance of a higher value at higher voltages also shown in FIG. 1 (and FIG. 12 of my copending application Ser. No. 08/461,499). Low level ground conditioning $GC_L$ is advantageous for filtering current and voltage amplitudes that are within the above described 0.1 Ω impedance limitation.

Electrical Energy Coupling from Noise Sources $GC_L$ conditioning is effective because it can address various noise sources. The problem with electrical noise in electronic circuitry is that it is unwanted, unsolicited, potentially damaging, if not disruptive, electrical energy. Usually, but not always, the noise origin is a nearby seemingly independent electrical system. Two or more seemingly independent electrical systems may in fact be electrically coupled with each other.

The ground line is an example of a noise sensitive circuit in close proximity to external noise sources in seemingly independent electrical systems. The ground line originates as electrical safety ground at the service entrance of a power distribution system. The safety ground line also provides the earth ground reference to electronic systems. In the same power distribution bundle, along with the safety ground line, is the hot and neutral lines with their inherent noise voltages and currents as a consequence of the various loads they power. The close proximity bundling of the ground line with the noisy hot and neutral lines is one common way by which electrical noise in one seemingly independent electrical system—the hot and neutral power line distribution—is coupled into another seemingly independent system—the earth ground reference system.

The electrical coupling may occur by one or both of two types of field coupling: Electrical Field, and Magnetic Field. While electrical coupling can occur due to either time invariant fields or time variant fields, the most troublesome coupling is due to time variant fields which will be referred to as AC coupling. Ground conditioning filtering is concerned with filtering noise coupled from one circuit to another by either magnetic or electric time variant field means.

Electric field coupling can occur through three distinct type of components: resistive, inductive, and capacitive. That is, when a voltage gradient exists between two seemingly isolated circuits, current may be coupled from one circuit to the other by way of a resistive conduction path, an inductive conducting path or a capacitive conduction path.

The resistive and inductive conduction path is characterized by what is known as Galvanic conduction. That is, a low impedance metallic path is established between the two circuits. Usually these paths are self-evident; consequently, easily spotted and eliminated, if they are suspected to be troublesome noise conduction paths.

The more insidious conduction path is the capacitive conduction path. In a capacitive conduction path, displacement current flows through a non-conductive medium. Further, the displacement current is proportional to the time rate of change of the voltage across the non-conductive medium as well as the capacitance of the medium. Since most electrical circuits are surrounded by insulation (a non-conductive medium), it becomes difficult to tell that a displacement current may be flowing through the medium. Here, displacement current is injected from one circuit to another. I will generically refer to electric field coupling as "injection" coupling.

The other basic type of coupling is time variant magnetic coupling. Magnetic coupling occurs when a time variant magnetic field is changing within a closed loop circuit. Magnetic coupling can also be insidious because it acts at a distance and does not require galvanic or metallic paths between the circuits. Like capacitive coupling, magnetic coupling acts across a non-conductive barrier—again, also known as an insulator. Time variant magnetic coupling is initiated by time varying current. Magnetic coupling can also be described as inductive coupling and is the mechanism by which the primary and secondary of a transformer are coupled. I will refer to this type of coupling as "inductive" coupling.

Electric fields and magnetic fields can operate cooperatively to couple energy from one circuit to another and consequently, couple energy over a longer distance. The phenomena is usually referred to as electro-magnetic coupling or "radio waves" transmission. Either circuit could be the transmitter, while the other circuit is the receiver; or either circuit may behave as both simultaneously. This type of coupling is known as "transmission" coupling.

DESCRIPTION OF THE PRIOR ART

$GC_H$ Standalone FIG. 2

Figure 2:
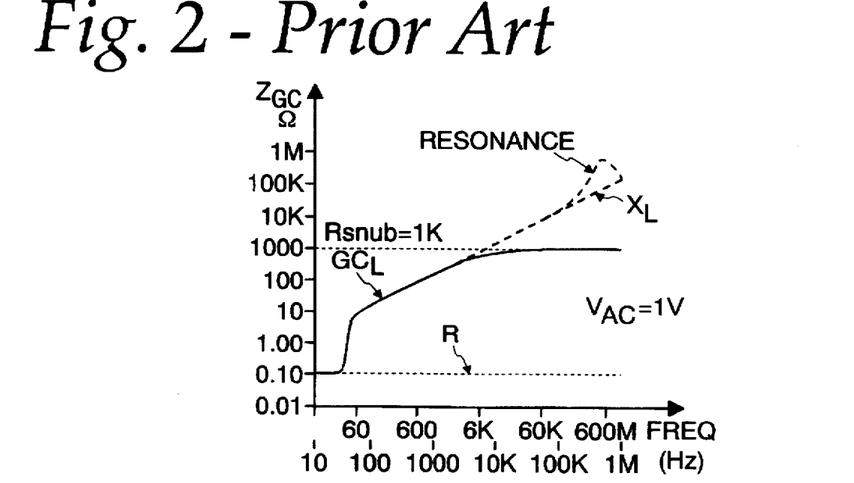
FIG. 2 (prior art) is a graph showing AC power frequency impedance of $GC_L$ with a stubbing resistor.

While this product is not related to $GC_L$, it is included for reference. The circuit of standalone $GC_H$ is shown in FIG. 2. High level Ground Conditioning ($GC_H$) will be an impedance that UL will probably limit to a maximum value of about 10K Ohms, at the power frequency, and at 120 VAC. For this much impedance to be put into the safety ground without compromising safety ground protection to the load, UL requires that an appropriate GFCI be used in conjunction with $GC_H$. $GC_H$ must be integrally packaged with the GFCI. I refer to the appropriateness of the GFCI as "GFCI with Bypass".

$GC_H$ is also a subject of my '443 patent. The GFCI described in '443 does not include output neutral-ground short circuit protection as well as input open neutral protection and thus would not pass UL requirements for safety.

$GC_M$ Standalone, FIG. 5

This product is also not related to $GC_L$, but is included for reference. Medium level ground conditioning ($GC_M$) is the principal subject of the '443 patent and its function and benefits are described in detail in there. Essentially, UL has allows the use of an impedance in the ground line, at a higher voltage level than $GC_L$, but without the need of a GFCI, only when the ground impedance is used in conjunction with an isolation transformer. However, the ground impedance can only be on the primary (input) side of the neutral to ground bond formed on the secondary of the transformer.

Specifically, the maximum value for $GC_M$, as determined by UL, is limited to 120 VAC divided by two times the current rating of the branch line over current protector, Ioc, or $ZGC_M$=120 VAC/2 Ioc. For a branch power line protected by a 20 Amp overcurrent protector (fuse or circuit breaker), $ZGC_M$=3.0 Ohms at 60 Hz, 120 VAC.

UL has gone on to further define the requirements of the isolation transformer, after I submitted the first patent application, and requires that the transformer have a double insulated primary winding and double insulation primary wiring. The filter and MOV shown in FIG. 5 are optional, but complete the technical requirements for a transformer based power line filter.

SUMMARY OF THE INVENTION

It is therefore an object of the invention to provide a conditioning circuit for power distribution systems which addresses the above-described insufficiencies of the prior art. It is another object of the present invention to provide a low level ground conditioning circuit for filtering current and voltage amplitudes at frequencies which exceed the power frequencies at less than 25 A at 2.5 VAC, thus limiting various noise sources.

It is another object of the present invention to provide a low level ground conditioning circuit which maintains an acceptable "safety" impedance of 0.1 Ω at more than 25 A at 2.5 VAC.

It is another object of the present invention to provide transformerless low level ground conditioning utilizing the presence of prescribed saturation characteristics to allow the ground impedance to exceed the 0.1 Ω limitation at frequencies which exceed the power frequencies.

It is another object of the present invention to provide a system and method of transformerless low level ground conditioning which is of simple design, has increased reliability, and has a lower cost of manufacturing.

In brief, the present invention provides a method for suppression of transient impulses from various noise sources by utilizing an inductive element to determine the ground impedance at the power frequencies and a resistor element that determines ground impedance at the higher frequency of the noise region. Utilizing prescribed saturation characteristics, the ground impedance would be allowed to exceed the 0.1 Ω safety limitation at frequencies exceeding the power frequencies at less than 25 A at 2.5 VAC. The ground impedance would still maintain the safety limitation of 0.1 Ω or less at current levels greater than 25 A at 2.5 VAC.

BRIEF DESCRIPTION OF THE DRAWINGS

The following drawings, in which like reference characters indicate like parts, are illustrative of embodiments of the invention and are not intended to limit the scope of the invention in any manner whatsoever, as encompassed by the claims forming a part hereof.

DETAILED DESCRIPTION OF THE PREFERRED EMBODIMENTS

Low Level Ground Conditioning ($GC_L$)

FIG. 1 is a graph showing the voltage versus current characteristics of $GC_L$ compared to that of a pure resistor, R, as described above in the Background. FIG. 2 shows the benefit of using a snubbing resistor to smooth or essentially eliminate impedance resonances at higher frequencies. This is of advantage in the field where conditioning is needed that addresses wide differences in the frequencies encountered and differences in impedances as actually manufactured rather than the theoretical.

Figure 3:
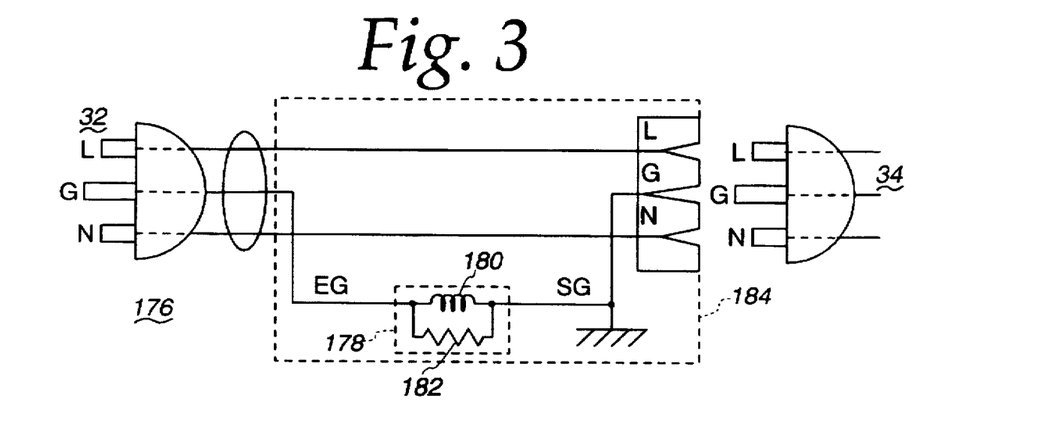
FIG. 3 is a schematic of a first $GC_L$ Standalone circuit.

FIG. 3 (which corresponds to FIG. 10 of my copending application Ser. No. 08/461,499) shows that the ground conditioning circuit 176 includes an impedance 178 located in the ground line G-SG between the EG and SG. The impedance 178 can be an inductor 180 connected in parallel with a resistor 182. The circuit 176 can be located within an enclosure 184. The impedance 178, also herein referred to as $GC_L$, has an inductive reactance of less than 0.1 ohms at 60 Hz for a voltage greater than or equal to 2.5 VAC—a safety agency dictated limitation. However, $ZGC_L$ can be any impedance for 60 Hz voltages below 2.5 VAC. The impedance 178 is configured to block 60 Hz voltages in the range of 0 to 1.5 VAC. The resistor 182 is rated at 1000 Ω. Resistor 182 could, however, be rated at a higher or lower value depending upon the application and the requirements for snubbing.

At 60 Hz, the impedance 178 has an impedance of up to 10 Ω, from 0 VAC to about 1.0 VAC, the threshold of $GC_L$, and then decreases to 0.1 Ω at 2.5 VAC, as shown in FIG. 1. The $GC_L$ circuit 176 operates to choke high frequency transient currents. Low level ground conditioning $GC_L$ is frequency and amplitude dependent on the impulse transient current. As the frequency of the voltage on the ground line goes up, the threshold goes up proportionately. For example, at 600 Hz $GC_L$ will be 100 Ω up to 10.0 VAC at which time it begins to saturate and look like a lower impedance.

Medium ($GC_M$) and High Level Ground Conditioning ($GC_H$)

As described in my copending application Ser. No. 08/461,499, the impedance (%) of medium level ground conditioning is set froth in the following formula, $$Z\ GC_M = V_L/(2 \times I_{oc}) \qquad (1)$$

where VL is the value of the power distribution line voltage and Ioc is the current rating of the overcurrent protection for the power distribution system containing $ZGC_M$. Ioc will have typical values of 15 A, 20 A, or 30 A or higher. This formula describes the maximum value of $ZGC_M$ that will be allowed by UL.

Since the filing of my copending application Ser. No. 08/461,499 I have determined that high level ground conditioning is accomplished at much higher impedance values and will probably be:

$$Z\ GC_H = V_L/(2 \times I_{gfci}) \qquad (2)$$

where Igfci is the ground fault circuit interrupter trip current that is nominally set for $$I_{gfci} = 6\ mA \qquad (3)$$

Accordingly, the formula (3) (pg. 22 of my copending application Ser. No. 08/461,499) previously referred to as $GC_H$ now actually reflects medium level ground conditioning ($GC_M$)

Figure 26:
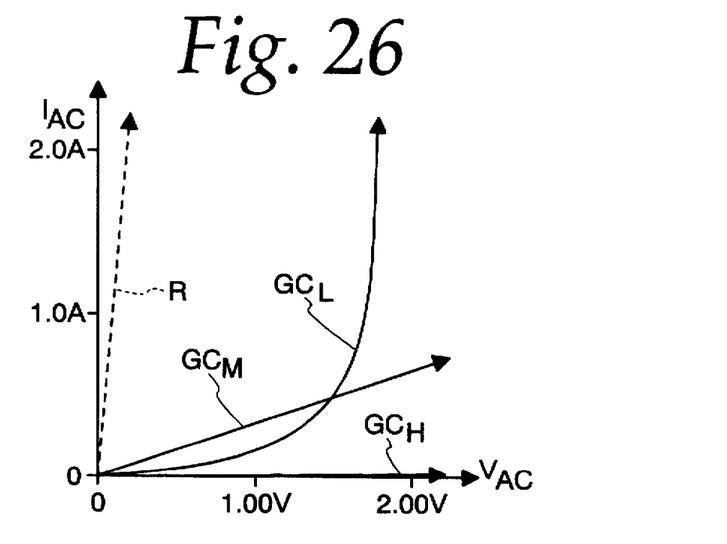
FIG. 26 is a graph showing AC power frequency impedance of $GC_L$, $GC_M$ and $GC_H$ versus that of a pure resistor at lower voltage and current to further illustrate the differences at $GC_L$.
Figure 27:
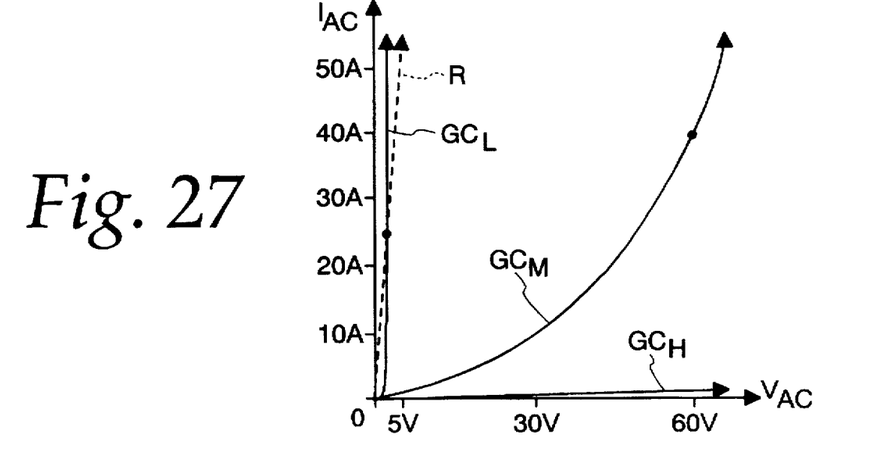
FIG. 27 is a graph showing AC power frequency impedance of $GC_L$ versus that of a pure resistor at higher voltage and current to further illustrate the behavior of $GC_L$, $GC_M$ and $GC_H$.

Referring to FIG. 1 and comparing it to FIG. 26 it can be seen that voltage versus current characteristics of high level ground conditioning (formerly $GC_H$, now referred to as $GC_M$) illustrate that there is no sharp break point characteristic as in low level ground conditioning $GC_L$, and the curve has a smaller angle of increase, up to or above 5.0 volts AC. This indicates the higher impedance of medium level ground conditioning $GC_M$ with respect to low level ground conditioning $GC_L$. The impedance for $GC_L$ is greater than the impedance for $GC_M$ at a voltage of less than 1.5 v, and at higher voltages the impedance for $GC_L$ is less than the impedance for $GC_M$.

All magnetic material core based inductors (non air or vacuum core) will have a break point at which the core saturates and loses its permeability. While this is true for all inductors, it is significant at $GC_L$ levels because the break is an important feature in the function of $GC_L$ to provide a safety agency approved low impedance at 2.5 volts AC and higher, at the normal power frequencies, but higher impedance for noise levels below 2.5 volts AC.

The advantage of medium level ground conditioning, $GC_M$, over low level ground conditioning $GC_L$ is that this higher level ground conditioning, $GC_M$, can provide more than 30 times (3 ohms/0.1 ohms) the ground conditioning capacity of low level ground conditioning, $GC_L$, at 60 Hz voltages greater than 2.5 VAC. For both medium and low level ground conditioning, and apart from the need to have certain characteristics at 60 Hz, these ground conditioners perform an electrical filtration function to block higher frequency noise and a surge current from conducting into a computer system ground. Wide band impedance capability is desired in its application, i.e. a bandwidth of 100 MHz has been set. Further, these ground conditioners need to block surge currents in the ground lines that are injected by surge diverters. In order to meet this requirement, high and low ground conditioning must block, without saturating, high energy noise frequency components in the 5 to 2000 KHz range or even higher.

Figure 28:
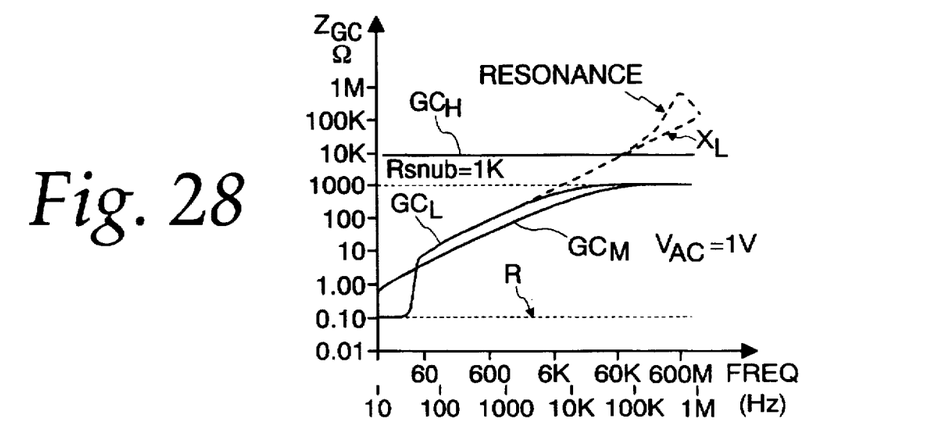
FIG. 28 is a graph showing impedance relative to frequency at 1 v.
Figure 29:
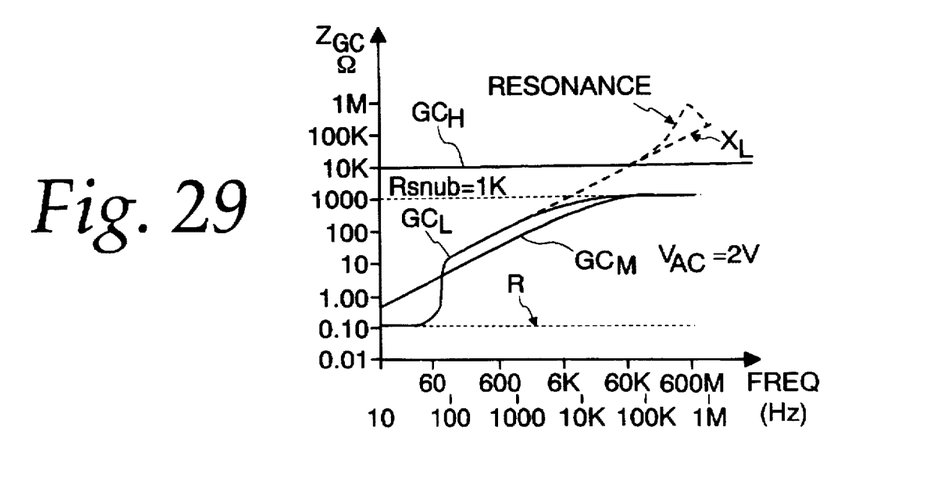
FIG. 29 is a graph showing impedance relative to frequency at 2 v.

FIGS. 28 and 29 show impedance relative to frequency at 1 v, and 2 v, respectively. It can be seen from FIG. 28 that at 1 volt AC, $GC_L$ has considerable impedance at 60 Hz, dropping to a low impedance at power frequencies below 60 Hz, while in FIG. 29, at 2 volts AC, $GC_L$ at 60 Hz remains a low impedance.

The ground impedance for $GC_H$ and $GC_L$ have been described as an inductor usually in parallel with a resonant damping ("snubbing") resistor. The ground impedance could also be resistors, capacitors, diodes, transistors or combinations thereof as discussed in my patent application Ser. Nos. 07/921,337 filed Jul. 29, 1992 and 08/404,532 filed Mar. 15, 1995, which are incorporated by reference as if fully set forth herein. These alternatives could be adapted to meet the characteristics shown in FIG. 12 of my copending application Ser. No. 08/461,499.

$GC_L$ Standalone FIG. 4

$GC_L$ is described in detail in my copending patent application Ser. No. 08/461,499. The impedance characteristics of $GC_L$ are those of a saturating inductor, whereby, at a 60 Hz voltage level of 2.5 VAC and higher, the impedance of $GC_L$, looks like 0.1 Ohms or less. Thereby UL is satisfied that this impedance can go into the safety ground line without any other requirements. An important GC benefit of $GC_L$ is discussed with reference to a frequency of about 60 Hz, for voltage levels of about 1 Volt or less. At this level and lower, the impedance of $GC_L$, is 10 Ohms as shown in FIG. 1 and in greater detail in FIG. 26. Another benefit is at higher frequencies as discussed herein. There would be proportional changes where, for example, line power is supplied at different frequencies, e.g. 50 Hz but the principles described for $GC_L$ would still apply. However, at significantly higher frequencies, such as those of typical noise, $GC_L$ will provide a much higher impedance. It is also advantageous to use a snubbing resistor to smooth that portion of the curve shown at higher frequencies.

$GC_L$ in Various Applications

The following circuit components and hardware applications are advantageous uses of $GC_L$:

1. Isolation Transformers
2. Power Supplies for Computers and other Electronics
3. Uninterruptible Power Supplies (UPS), Off-line & On-line
4. Distribution Panels
5. Electrical Filters
6. Transient Voltage Suppressors (TVSS) (Surge Diverters)
7. Ground Fault Circuit Interrupters (GFCIs)

$GC_L$ With Isolation Transformers

Figure 7:
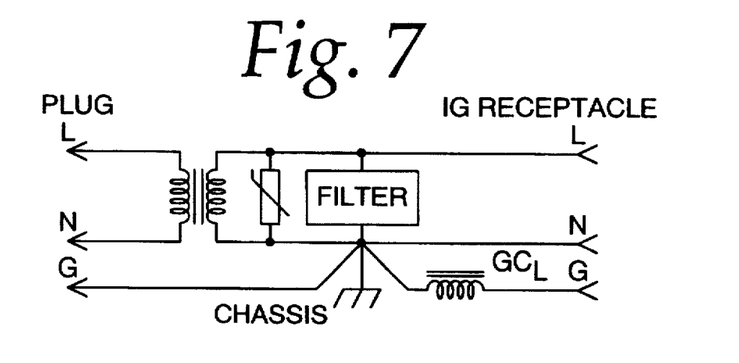
FIG. 7 is a schematic of a circuit having an isolation transformer based power line filter in the secondary ground.
Figure 8:
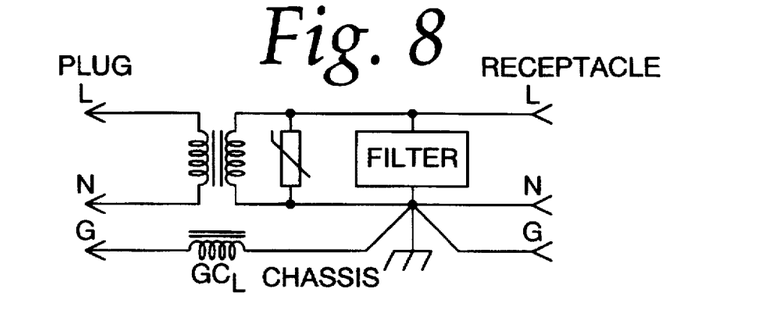
FIG. 8 is a schematic of a circuit having an isolation transformer based power line filter in the primary ground.
Figure 9:
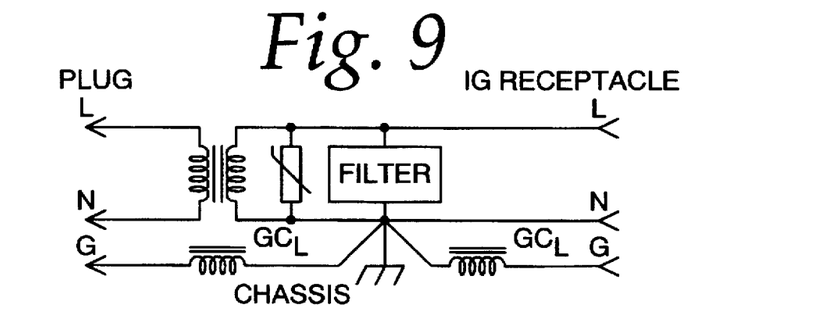
FIG. 9 is a schematic of a circuit having isolation transformer based power line filters in the primary ground and the secondary ground.

FIGS. 7, 8, and 9 show various configurations for using isolation transformer based power line filters in conjunction with $GC_L$. Similarly, as will be shown, other isolation transformer applications such as UPS (both Off-line & On-line) and Power Supplies could also benefit from the inclusion of $GC_L$.

These configurations are improvements upon the principles taught in my '443 patent. However, that patent did not contemplate ground conditioning having the values taught herein, in part because at the time of that application, safety agencies did not approve $GC_L$.

In FIG. 7, the standalone $GC_L$ is integrated with a transformer based power line filter to achieve hot (L) and neutral (N) protection as well as ground conditioning. The ground conditioning impedance, $GC_L$, is in the secondary ground wire.

In FIG. 8, the standalone $GC_L$ is integrated with a transformer based power line filter to achieve hot (L) and neutral (N) protection as well as ground conditioning. The ground conditioning impedance, $GC_L$, is in the primary ground wire. However, unlike $GC_M$, UL does not require that the transformer have a double insulated primary with double insulated primary wiring. Further, the maximum impedance characteristics of $GC_L$ are different than the maximum impedance characteristics of $GC_M$—as discussed earlier.

As Shown in FIG. 9

$GC_L$ impedances can be placed in both the primary and secondary ground wiring, an improvement over FIGS. 7 and 8. The advantage of this filtering technique is that it beefs up the effective ground conditioning impedance, by two times, and blocks ground surge currents coming in the input plug ground from conducting through the output receptacle hot "L" and neutral "N". This can be done with no adverse impact on safety standards because of the safety agency acceptance of the isolation transformer and the safety agency limit for $GC_L$.

Power Supplies with Isolation Transformers, Linear & SMPS

Figure 10:
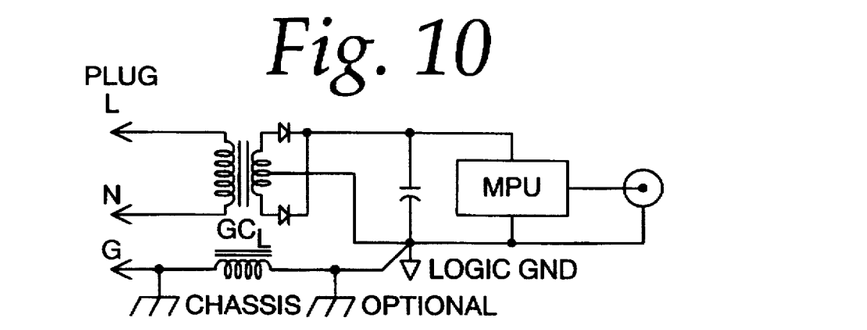
FIG. 10 is a schematic of a circuit having $GC_L$ for linear power supplies where the conversion process is direct off the power line.

Computers or other electronic equipment require some type of power conversion that converts AC input voltage to DC voltages that the system can use to power up the electronics. These converters are generally called power supplies. Power supply technology can be generically referred to under two categories, linear and switch mode power supplies (SMPS). Usually, but not always, there is some type of transformer, usually but not always an isolation transformer converts the AC input voltage to a lower voltage more compatible with the voltage requirements of the electronics. For linear power supplies the conversion process is direct off the power line and the approach is shown in FIG. 10.

Figure 11:
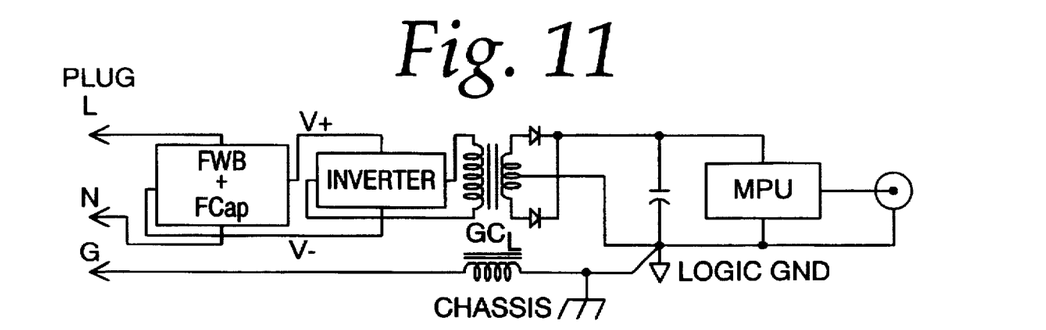
FIG. 11 is a schematic of a circuit having SMPS to convert the input AC to a high DC voltage by way of a full-wave bridge and capacitor filter.

SMPS, on the other hand, as shown in FIG. 11, convert the input AC to a high DC voltage by way of a full-wave bridge and capacitor filter. The high DC voltage is "chopped" by the inverter at a high frequency and converted to a high frequency, high AC voltage that is in turn reduced to a lower AC voltage by the high frequency isolation transformer. The high frequency, low voltage AC is then converted to a DC voltage to power up the electronics, similar to the circuitry used with linear power supplies. For either type of power supply, $GC_L$ can be used.

$GC_L$ in UPS Including AC-UPS with Integral GFCI and DC-UPS

Uninterruptible Power Supplies (UPS) are reserve power, electrical energy sources for electronic systems. Specifically, electrical energy is stored in a renewable reservoir, such as a battery, and is then converted to an AC voltage by an inverter that in turn is electrically coupled to an electronic load in the event the main AC power fails.

UPSes can be classified into two types; on-line and off-line. The conventional on-line UPS is continually converting AC to DC to charge up its DC energy reservoir and converting it back again to AC with its inverter circuit to drive the load. When the main power goes to a low voltage (brown out) or outage condition, the on-line UPS is automatically providing power to the load from its DC energy reservoir.

In contrast to the on-line UPS, in the event of a detected low voltage or outage condition of the main power, the off-line UPS uses either a power relay or a semiconductor to switch its load from the main power connection to the energy reservoir. The off-line UPS couples its energy reservoir to its load through an inverter comparable to that used in the on-line UPS. The off-line UPS is also continually charging up its energy reservoir, but it does not need to keep its inverter section running at power as does the on-line UPS. The off-line UPS inverter is only in operation when reserve power is required. Of the two types of AC-UPS—on-line and off-line the off line tends to be the least expensive and more reliable because of its stand-by mode of operation. The off line family of designs is shown in FIGS. 12, 13 & 14.

Figure 12:
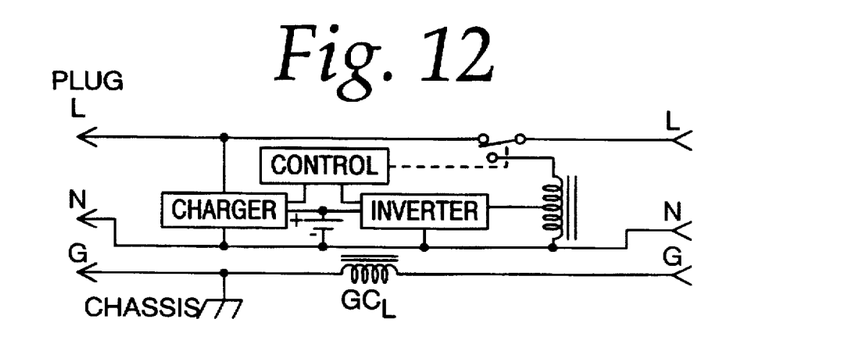
FIG. 12 is a schematic of a circuit having a UPS, with $GC_L$ Off-line.
Figure 13:
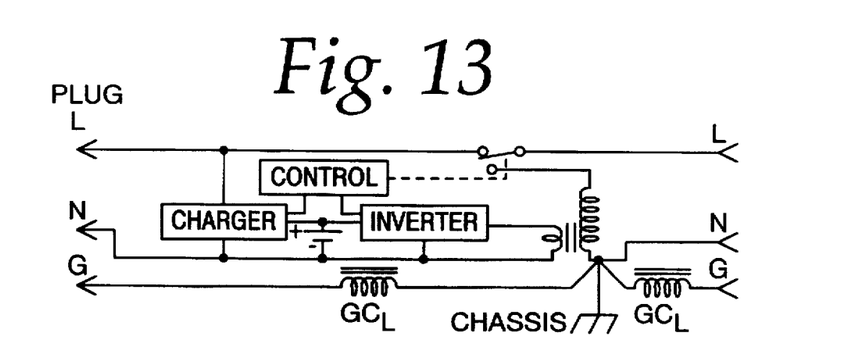
FIG. 13 is a schematic of a circuit having a UPS, with an alternative $GC_L$.
Figure 14:
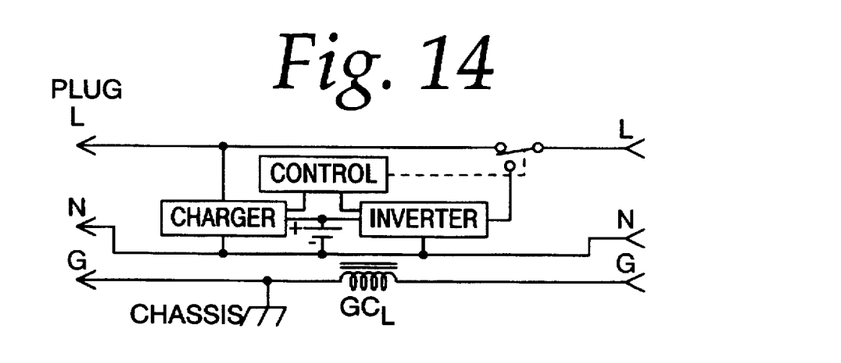
FIG. 14 is a schematic of a circuit having a UPS, with an alternative $GC_L$ Off-line.
Figure 15:
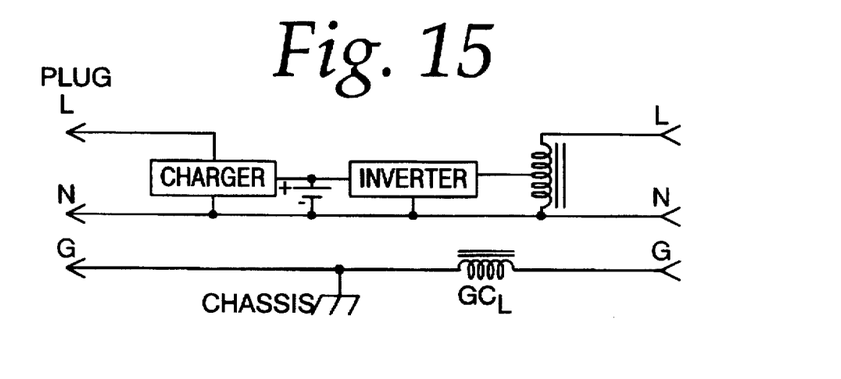
FIG. 15 is a schematic of a circuit having a UPS, with $GC_L$ On-line.
Figure 16:
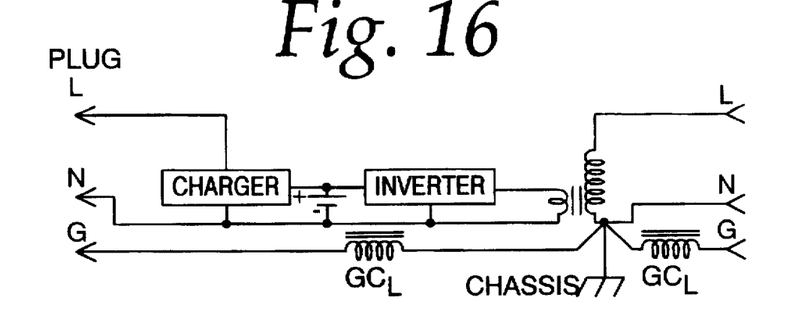
FIG. 16 is a schematic of a circuit having a UPS, with another alternative $GC_L$ On-line.
Figure 17:
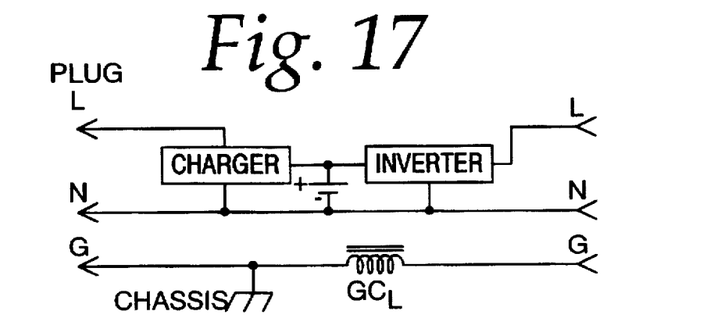
FIG. 17 is a schematic of a circuit having a UPS, with an alternative $GC_L$ On-line.

In the various UPS approaches an inverter may be coupled to the power line by either an auto-transformer, as shown in FIGS. 12 and 15, an isolation transformer, as shown in FIGS. 13 & 16, or coupled directly as shown FIGS. 14 & 17

In the above referenced UPSes, FIGS. 12, 13, 14, 15, 16 and 17, the input is power line AC voltage and the output is the same or substantially the same. There is a class of UPSs which have an AC input from the power line but convert the input power to DC and use that as the output voltage. My copending application Ser. No. 08/461,499 describes such a DC UPS.

There are applications where an off-line AC-UPS will be preferred over the DC-UPS and common mode noise filtering and high level ground conditioning are still desired. As mentioned, a requirement of off-line UPSes is that the energy reservoir needs to be switched into the power providing path for the load when the main power source has detected low voltage or voltage outage. Typically, a conventional off-line AC UPS uses either a power relay or a semiconductor circuit to provide this switch function. While it is easy enough to add a GFCI with the appropriate ground impedance to the off-line UPS, note that the GFCI function and off-line AC-UPS function each provides a set of power switches to the power line. A more cost effective way of providing the AC-UPS function as well as the GFCI function is to combine the power switching sections of both as well as the control logic.

The On-line design is always powering the load from its reservoir, the battery, and does not require a transfer switch to switch in the reserve energy source in the event of a main AC power failure. The family of on-line UPS designs is shown in FIGS. 15, 16, and 17. As shown in FIGS. 12 thru 17, $GC_L$ can be used in all design possibilities for UPS.

$GC_L$ can also be used with an off-line UPS with and integral GFCI as described in my copending application Ser. No. 08/461,499.

Figure 18:
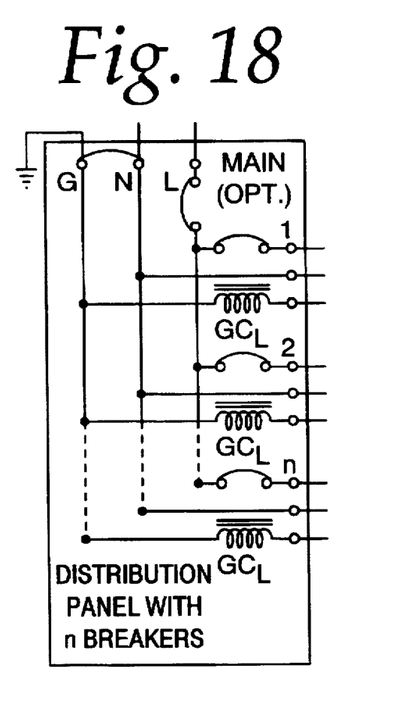
FIG. 18 is a schematic of a circuit having $GC_L$ in an Electric Distribution Panel.
Figure 19:
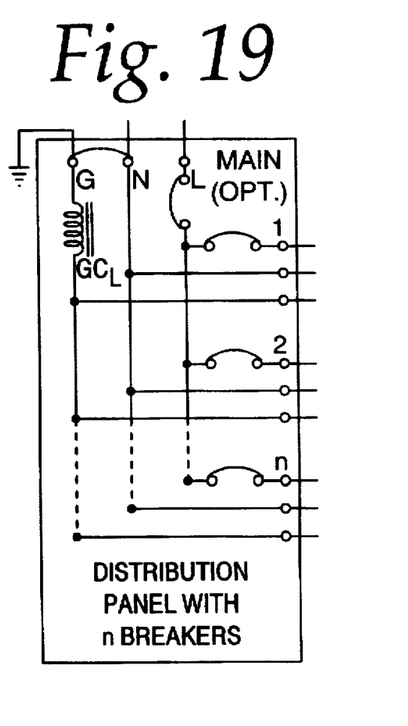
FIG. 19 is a schematic of a circuit having an alternative embodiment of $GC_L$ in an Electrical Distribution Panel with GCI in an input ground.
Figure 20:
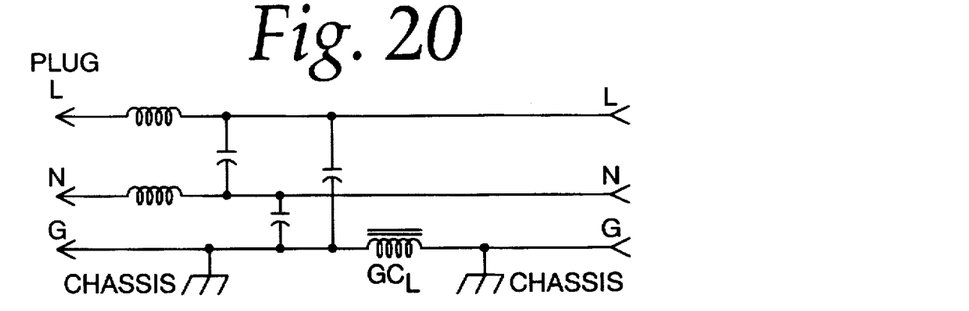
FIG. 20 is a schematic of a circuit having $GC_L$ with an electrical filter.
Figure 21:
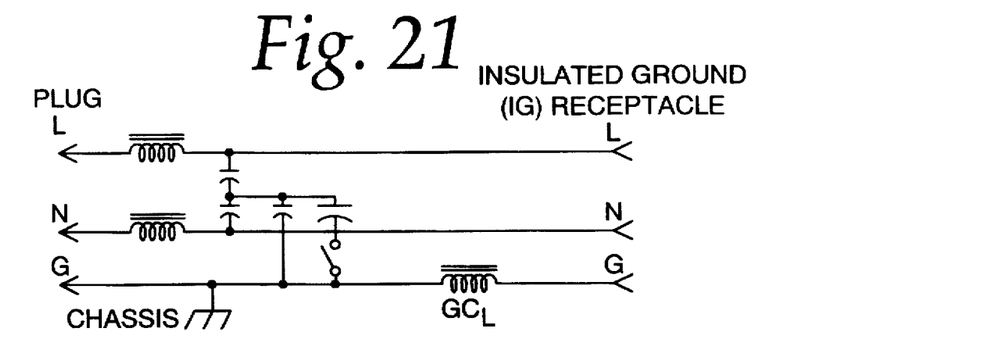
FIG. 21 is a schematic of a circuit having $GC_L$ with an Electronic Enhanced Filter.

In Electrical Distribution Panels, FIGS. 18 & 19

$GC_L$ is usable as a component to stop surges and ground loop noise currents at the power distribution source, the power distribution panel. FIG. 18 shows $GC_L$ used in each ground wire of the branch feeds. That way ground currents are blocked from input to output, and blocked from forming current loops within the branches. FIG. 19 shows $GC_L$ used only to block ground currents from input to output. Also, any combination of FIGS. 18 & 19 might be used.

In Electrical Filters, TVSS, and GFCI, FIGS. 20, 21, 22, 23 and 24

Figure 22:
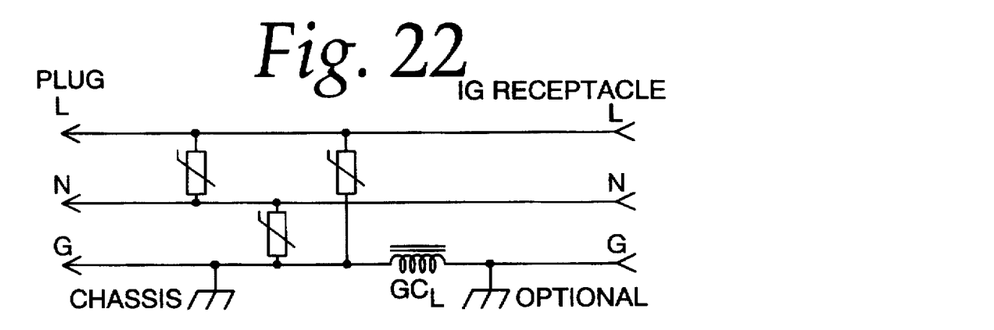
FIG. 22 is a schematic of a circuit having $GC_L$ with a three stage Transient Voltage Suppressors (TVSS).
Figure 23:
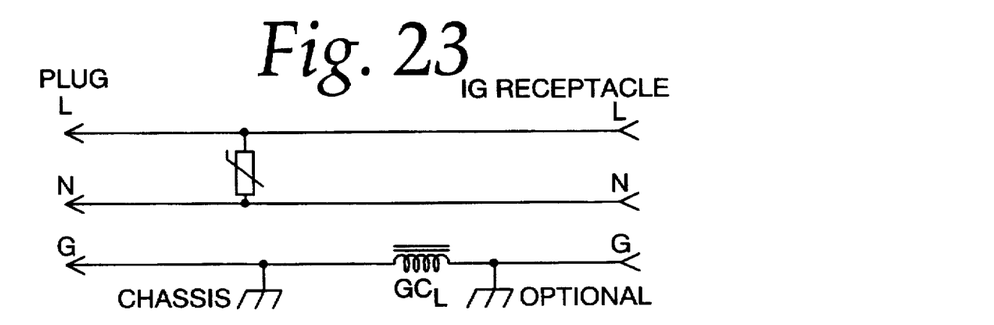
FIG. 23 is a schematic of a circuit having $GC_L$ with a single stage Transient Voltage Suppressors (TVSS).
Figure 24:
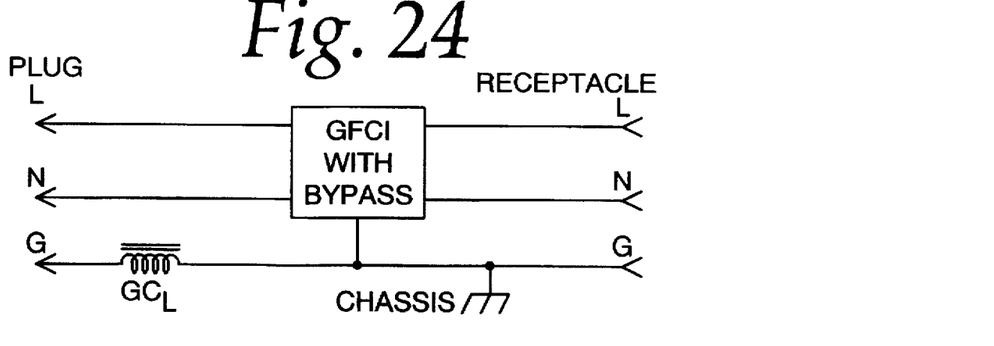
FIG. 24 is a schematic of a $GC_L$ Standalone with a GFCI bypass.

The nature of $GC_L$ is that it requires no external circuitry to support its safe inclusion in the ground line. Electrical filters of the type shown in FIG. 20, or the Electronic Enhanced Filter of the type shown in FIG. 21, and also the subject of my copending application Ser. No. 08/461,499, can readily include $GC_L$ in their function. The same is true for Transient Voltage Suppressors (TVSS), either three stage or single stage as shown in FIGS. 22 & 23 respectively. Likewise, with GFCIs, as shown in FIG. 24, $GC_L$ should be readily incorporated without the safety agency standards to which $GC_H$ would be subjected.

Figure 25:
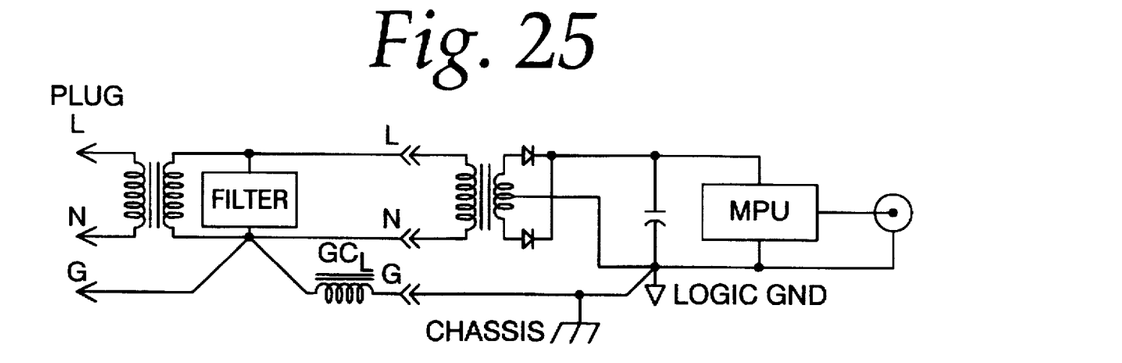
FIG. 25 is a schematic of a Power Line Conditioner (PLC), with $GC_L$ in the secondary.

FIG. 25 is a schematic of a Power Line Conditioner (PLC), with $GC_L$ in the secondary—the same circuit of FIG. 7—shown protecting the input of a isolation transformer based linear power supply providing DC voltage for an electronic circuit. The linear power supply is the same as shown in FIG. 8.

As many and varied modifications of the subject matter of this invention will become apparent to those skilled in the art from the detailed description given hereinabove, it will be understood that the present invention is limited only as provided in the claims appended hereto.

I claim:

1. A device for suppressing transient currents on a ground line of a power distribution system, the power distribution system having a power line and a neutral line, the device comprising:

inductor means for attenuating a surge current propagating on the ground line, said inductor means located between an input terminal and an output terminal of the ground line, said surge current being supplied to the ground line by a coupling with the ground line, said inductor means having a primary winding on a saturable core of a predetermined inductive reactance value; and a resistor connected in parallel with said inductor means between said input and said output terminals of the ground wire;

whereby said inductor means and said resistor isolate the ground line from the power line between said input and said output terminals of the ground wire thereby forming a ground impedance for suppressing transient currents on the ground line, and wherein said coupling of said surge current to the ground line is an injection coupling whereby an electronic device is coupled between the power line and the ground line and said device supplies said surge current.

2. A device for suppressing transient currents on a ground line of a power distribution system, the power distribution system having a power line and a neutral line, the device comprising:

inductor means for attenuating a surge current propagating on the ground line, said inductor means located between an input terminal and an output terminal of the ground line, said surge current being supplied to the ground line by a coupling with the ground line, said inductor means having a primary winding on a saturable core of a predetermined inductive reactance value; and a resistor connected in parallel with said inductor means between said input and said output terminals of the ground wire;

whereby said inductor means and said resistor isolate the ground line from the power line between said input and said output terminals of the ground wire thereby forming a ground impedance for suppressing transient currents on the ground line, and wherein said coupling of said surge current to the ground line is an injection coupling whereby an electronic device is coupled between an external wiring system and the ground line and said device supplies said surge current.

3. A device for suppressing transient currents on a ground line of a power distribution system, the power distribution system having a power line and a neutral line, the device comprising:

inductor means for attenuating a surge current propagating on the ground line, said inductor means located between an input terminal and an output terminal of the ground line, said surge current being supplied to the ground line by a coupling with the ground line, said inductor means having a primary winding on a saturable core of a predetermined inductive reactance value; and a resistor connected in parallel with said inductor means between said input and said output terminals of the ground wire;

whereby said inductor means and said resistor isolate the ground line from the power line between said input and said output terminals of the ground wire thereby forming a ground impedance for suppressing transient currents on the ground line, and wherein said coupling of said surge current to the ground line is a transmission coupling from a remote source of electromagnetic radiation which remote source induces said surge current in the ground line.

4. A device for suppressing transient currents on a ground line of a power distribution system, the power distribution system having a power line and a neutral line, the device comprising:

inductor means for attenuating a surge current propagating on the ground line, said inductor means located an input terminal and an output terminal of the ground line, said surge current being supplied to the ground line by a coupling in the power distribution system with the ground line, said inductor means having a primary winding on a saturable core of a predetermined inductive reactance value; and whereby said inductor means isolate the ground line from the power line between said input and said output terminals of the ground wire thereby forming a ground impedance for suppressing transient currents on the ground line;

said impedance being low level ground conditioning ($GC_L$) which operates within the impedance of 0.1 Ω or less for currents more than 25 A at 2.5 VAC;

said device having a transformer based power supply circuit;

said transformer based power supply circuit having a primary side ground line and a secondary side ground line;

said device being operatively connected to said secondary ground line;

said device having an isolation transformer based power supply circuit;

said isolation transformer based power supply circuit having a primary side ground line and a secondary side ground line;

said ground conditioning device being operatively connected to said primary ground line and a second ground conditioning device being operatively connected to said secondary ground line.

5. A device for suppressing transient currents on a ground line of a power distribution system, the power distribution system having a power line and a neutral line, the device comprising:

inductor means for attenuating a surge current propagating on the ground line, said inductor means located an input terminal and an output terminal of the ground line, said surge current being supplied to the ground line by a coupling in the power distribution system with the ground line, said inductor means having a primary winding on a saturable core of a predetermined inductive reactance value; and whereby said inductor means isolate the ground line from the power line between said input and said output terminals of the ground wire thereby forming a ground impedance for suppressing transient currents on the ground line;

said impedance being low level ground conditioning ($GC_L$) which operates within the impedance of 0.1 Ω or less for currents more than 25 A at 2.5 VAC.

6. A device for suppressing transient currents on a ground line of a power distribution system, the power distribution system having a power line and a neutral line, the device comprising:

inductor means for attenuating a surge current propagating on the ground line, said inductor means located an input terminal and an output terminal of the ground line, said surge current being supplied to the ground line by a coupling in the power distribution system with the ground line, said inductor means having a primary winding on a saturable core of a predetermined inductive reactance value; and whereby said inductor means isolate the ground line from the power line between said input and said output terminals of the ground wire thereby forming a ground impedance for suppressing transient currents on the ground line;

said impedance having low level ground conditioning ($GC_L$) which operates within the impedance of 0.1 $\Omega$ or less for currents more than 25 A at 2.5 VAC said device having an earth ground and a neutral-ground bond; said impedance being connected to said ground line on the output side of said neutral-ground bond.

* * * * *